(12) United States Patent
Wei et al.

(10) Patent No.: US 8,991,532 B2
(45) Date of Patent: Mar. 31, 2015

(54) DETACHABLE POWER MODULE

(71) Applicant: Industrial Technology Research Institute, Hsin-Chu (TW)

(72) Inventors: Tseng-Te Wei, Hsinchu (TW); Yu-Yin Peng, Hsinchu (TW); Li-Ju Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/030,528

(22) Filed: Sep. 18, 2013

(65) Prior Publication Data

US 2014/0183930 A1 Jul. 3, 2014

(30) Foreign Application Priority Data

Dec. 27, 2012 (TW) .............................. 101150541 A

(51) Int. Cl.
B60K 7/00 (2006.01)
A61G 5/10 (2006.01)
A61G 5/04 (2013.01)

(52) U.S. Cl.
CPC ............ *B60K 7/0007* (2013.01); *A61G 5/1032* (2013.01); *A61G 5/047* (2013.01); *A61G 5/1008* (2013.01); *A61G 2005/048* (2013.01); *A61G 2200/20* (2013.01)
USPC .......................................... 180/65.51; 301/6.5

(58) Field of Classification Search
USPC ........ 180/65.51, 65.6; 903/951, 952; 301/6.1, 301/6.5
See application file for complete search history.

(56) References Cited

U.S. PATENT DOCUMENTS

| | | | |
|---|---|---|---|
| 3,930,551 A | 1/1976 | Cragg | |
| 3,941,198 A | 3/1976 | Kappas | |
| 3,955,639 A | 5/1976 | Cragg | |
| 3,956,451 A | 5/1976 | Adams | |
| 3,998,285 A | 12/1976 | Cooper | |

(Continued)

FOREIGN PATENT DOCUMENTS

| | | |
|---|---|---|
| TW | 452030 U | 8/2001 |
| TW | 459076 B | 10/2001 |
| TW | M389394 | 9/2010 |

OTHER PUBLICATIONS

Algood et al, Impact of a pushrim-activated power-assisted wheelchair on the metabolic demands, stroke frequency, and range of motion among subjects with tetraplegia, Arch Phys Med Rehabil vol. 85, Nov. 2004, pp. 1865-1871.

(Continued)

*Primary Examiner* — John Walters
(74) *Attorney, Agent, or Firm* — Rabin & Berdo, P.C.

(57) ABSTRACT

A disassembled and assembled power module includes: a wheel shaft; a power module; a central shaft, arranged in the power module and passing through the wheel shaft; and an engaging unit, capable of fastening the central shaft to the wheel shaft. In an embodiment when the detachable power module is applied in an electric driven wheelchair, it enables the weight of the wheelchair to be reduced by simply detach and remove the detachable power from the wheelchair so that the electric driven wheelchair without the heavy power module can be carry and transport easily, and also the moving range of the electric driven wheelchair can be increased as its power module can be easily detached and replaced with another fully charged power module so that the range anxiety of the disabled person using the same or the assistant can be relieved.

20 Claims, 8 Drawing Sheets

(56) References Cited

U.S. PATENT DOCUMENTS

| | | |
|---|---|---|
| 4,019,597 A | 4/1977 | Carmichael |
| 4,103,795 A | 8/1978 | Miller |
| 4,202,564 A | 5/1980 | Strader |
| 4,296,488 A | 10/1981 | Nakayama |
| 4,340,127 A | 7/1982 | Broberg |
| 4,350,190 A | 9/1982 | McColl |
| 4,356,875 A | 11/1982 | Clune |
| 4,386,672 A | 6/1983 | Coker |
| 4,429,242 A | 1/1984 | Layh |
| 4,462,451 A | 7/1984 | Ogren |
| 4,481,939 A | 11/1984 | Mabuchi |
| 4,659,148 A | 4/1987 | Grill |
| 4,660,465 A | 4/1987 | Jentzsch et al. |
| 4,668,358 A | 5/1987 | Ball |
| 4,672,773 A | 6/1987 | Bilt |
| 4,682,820 A | 7/1987 | Stalter |
| 4,697,864 A | 10/1987 | Hayes et al. |
| 4,847,030 A | 7/1989 | Stalter |
| 4,892,166 A | 1/1990 | Gaffney |
| 4,897,909 A | 2/1990 | LaVoy |
| 4,955,451 A | 9/1990 | Schaefer |
| 5,016,720 A | 5/1991 | Coker |
| 5,059,106 A | 10/1991 | Joseph |
| 5,134,778 A | 8/1992 | MacCarthy |
| 5,135,063 A | 8/1992 | Kropf |
| 5,149,242 A | 9/1992 | Haymore |
| 5,174,222 A | 12/1992 | Rogers |
| 5,215,137 A | 6/1993 | Weeks et al. |
| 5,246,082 A * | 9/1993 | Alber .......................... 180/65.51 |
| 5,327,034 A | 7/1994 | Couture et al. |
| 5,355,039 A | 10/1994 | Couture |
| 5,391,059 A | 2/1995 | Hallund |
| 5,427,193 A | 6/1995 | Avakian |
| 5,438,228 A | 8/1995 | Couture et al. |
| 5,605,493 A | 2/1997 | Donatelli et al. |
| 5,651,422 A | 7/1997 | Casali |
| 5,755,304 A | 5/1998 | Trigg et al. |
| 5,796,192 A * | 8/1998 | Riepl ......................... 310/67 R |
| 5,826,670 A | 10/1998 | Nan |
| 5,857,537 A | 1/1999 | Matsumoto et al. |
| 5,883,755 A | 3/1999 | Vollmann |
| 5,897,172 A | 4/1999 | Jarrell |
| 5,911,563 A | 6/1999 | Duppert et al. |
| 5,921,338 A | 7/1999 | Edmondson |
| 6,016,236 A | 1/2000 | Vollmann |
| 6,056,067 A | 5/2000 | Brown |
| 6,095,268 A | 8/2000 | Jones, Jr. |
| 6,102,069 A | 8/2000 | Di Betta et al. |
| 6,199,652 B1 | 3/2001 | Mastroianni et al. |
| 6,341,657 B1 | 1/2002 | Hopely, Jr. et al. |
| 6,408,961 B1 * | 6/2002 | Chen ........................... 180/6.5 |
| 6,446,496 B1 | 9/2002 | Fujii et al. |
| 6,481,515 B1 | 11/2002 | Kirkpatrick et al. |
| 6,487,897 B1 | 12/2002 | Fujii et al. |
| 6,684,969 B1 | 2/2004 | Flowers et al. |
| 6,688,447 B1 | 2/2004 | Liu |
| 6,725,955 B2 | 4/2004 | Bidwell |
| 6,805,371 B2 * | 10/2004 | Meginniss et al. ......... 280/250.1 |
| 7,011,321 B2 | 3/2006 | Hargroder |
| 7,048,499 B2 | 5/2006 | Mathson et al. |
| 7,114,730 B2 | 10/2006 | Cheldin |
| 7,117,967 B2 | 10/2006 | Kidd et al. |
| 7,127,997 B2 | 10/2006 | Nishihara et al. |
| 7,216,732 B2 | 5/2007 | Angerer et al. |
| 7,249,880 B2 | 7/2007 | Zambaux |
| 7,341,123 B2 * | 3/2008 | Brendel et al. ............. 180/65.51 |
| 7,431,494 B2 | 10/2008 | Zambaux |
| 7,472,005 B2 | 12/2008 | Ephraim |
| 7,485,116 B2 | 2/2009 | Cao |
| 7,686,145 B2 * | 3/2010 | Akagi et al. ................ 192/13 R |
| 7,828,101 B2 | 11/2010 | Radtke et al. |
| 7,849,945 B2 | 12/2010 | Ross, VII et al. |
| 7,886,853 B2 | 2/2011 | Konopa |
| 7,891,301 B2 | 2/2011 | Marguet et al. |
| 7,946,410 B2 | 5/2011 | DeMong et al. |
| 8,096,378 B2 | 1/2012 | Xie |
| 8,131,413 B2 | 3/2012 | Yuan |
| 8,151,924 B2 | 4/2012 | Radtke |
| RE43,418 E | 5/2012 | Zambaux |
| 8,336,904 B2 | 12/2012 | Kylstra |
| 2007/0062743 A1 | 3/2007 | Engels et al. |
| 2011/0095508 A1 | 4/2011 | Chiu |
| 2012/0223514 A1 | 9/2012 | Jurkiewicz et al. |
| 2013/0008732 A1 | 1/2013 | Richter |

OTHER PUBLICATIONS

Algood et al, Effect of a pushrim-activated power-assist wheelchair on the functional capabilities of persons with tetraplegia, Arch Phys MEd Rehabil, Mar. 2005, 86(3): 380-6.

Berry et al, Parent/caregiver perspectives on the use of power wheelchairs, Pediatric Physical Therapy, 1996, 8: 146-150.

Copper et al, Evaluation of a pushrim-activated, power-assisted wheelchair, Arch Phys Med Rehabil, May 2001, 82(5):702-8.

Fitzgerald et al, A pilot study on community usage of a pushrim-activated, power-assisted wheelchair, Assist Technol., Winter 2003, 15(2):113-9.

Koontz et al, Design features that affect the maneuverability of wheelchairs and scooters, Arch Phys Med Rehabil, May 2010, 91(5):759-64.

Taiwan Patent Office, Office Action issued on Sep. 4, 2014, Taiwan.

* cited by examiner

DETACHABLE POWER MODULE

CROSS REFERENCE TO RELATED APPLICATION

This application also claims priority to Taiwan Patent Application No. 101150541 filed in the Taiwan Patent Office on Dec. 27, 2012, the entire content of which is incorporated herein by reference.

TECHNICAL FIELD

The technical field relates to a detachable power module.

BACKGROUND

Assisting tools for disabled people help them to move freely as normal people in some degree. The wheel chair is a representative among the assisting tools.

Conventional wheel chairs are driven manually, which consumes physical energy. For a disabled person or an assistant thereof, sometimes the physical burden becomes unbearable.

In view of the inconvenience of the conventional wheel chairs, electric driven wheel chairs are produced in the industry. Though the electric wheel chair reduces the physical energy consumption of the disabled person or the assistant thereof, the electric wheel chair still has criticized defects. Devices such as a transmission device, a motor, a control circuit and a battery need to be installed on an electric wheel chair, so the electric wheel chair has a considerable weight, making it difficult to carry or transport the electric wheel chair. As a result, the disabled people are unable to travel freely to areas where they want to arrive. Therefore, it is worth discussing how to reduce the weight of the wheel chair.

SUMMARY

In an embodiment, the technical means of the disclosure is directed to a detachable power module, which includes:
a wheel shaft;
a power module;
a central shaft, arranged in the power module and passing through the wheel shaft; and
an engaging unit, capable of fastening the central shaft to the wheel shaft.

In an embodiment, the technical means of the disclosure is directed to a detachable power module, which includes:
a wheel shaft;
a power module;
a central shaft, arranged in the power module and passing through the wheel shaft;
an engaging unit, capable of fastening the central shaft to the wheel shaft; and
a releasing unit, arranged in the power module, the releasing unit being coupled to the engaging unit.

In an embodiment, the technical means of the disclosure is directed to a detachable power module, which includes:
a wheel shaft;
a power module;
a central shaft, arranged in the power module and passing through the wheel shaft;
an engaging unit, capable of fastening the central shaft to the wheel shaft;
a releasing unit, arranged in the power module, the releasing unit being coupled to the engaging unit; and
a wheel shaft adapter, coupled to the wheel shaft.

In an embodiment, the technical means of the disclosure is directed to a detachable power module, which includes:
a power module; and
a releasing unit, arranged in the power module.

DETAILED DESCRIPTION

Below, implementation manners of the disclosure are illustrated through specific embodiments. Persons having ordinary knowledge in the art can easily understand the disclosure according to the content disclosed in the specification.

Figure 1:
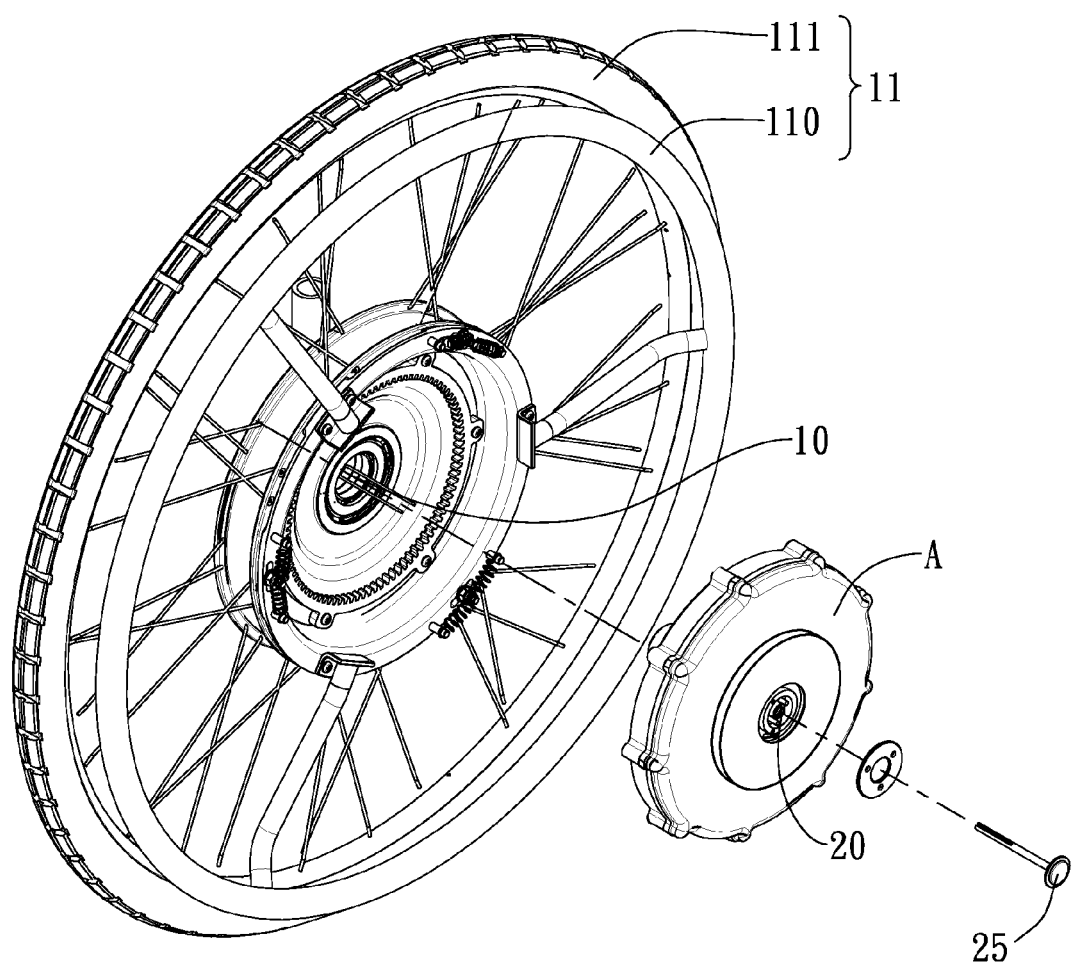
FIG. 1 is a schematic partial exploded three-dimensional view of a detachable power module according to a first embodiment of the disclosure.
Figure 2:
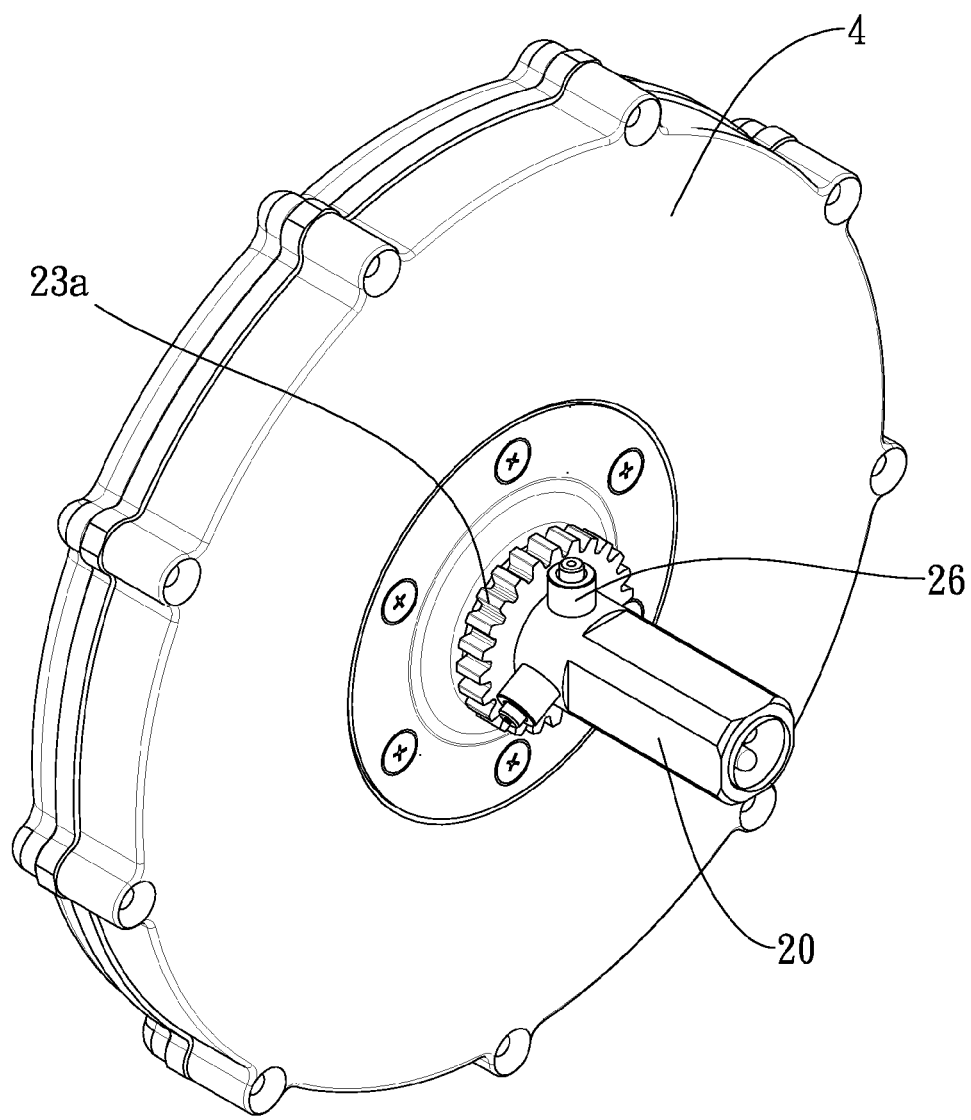
FIG. 2 is a schematic three-dimensional view of a power module according to the disclosure.
Figure 3:
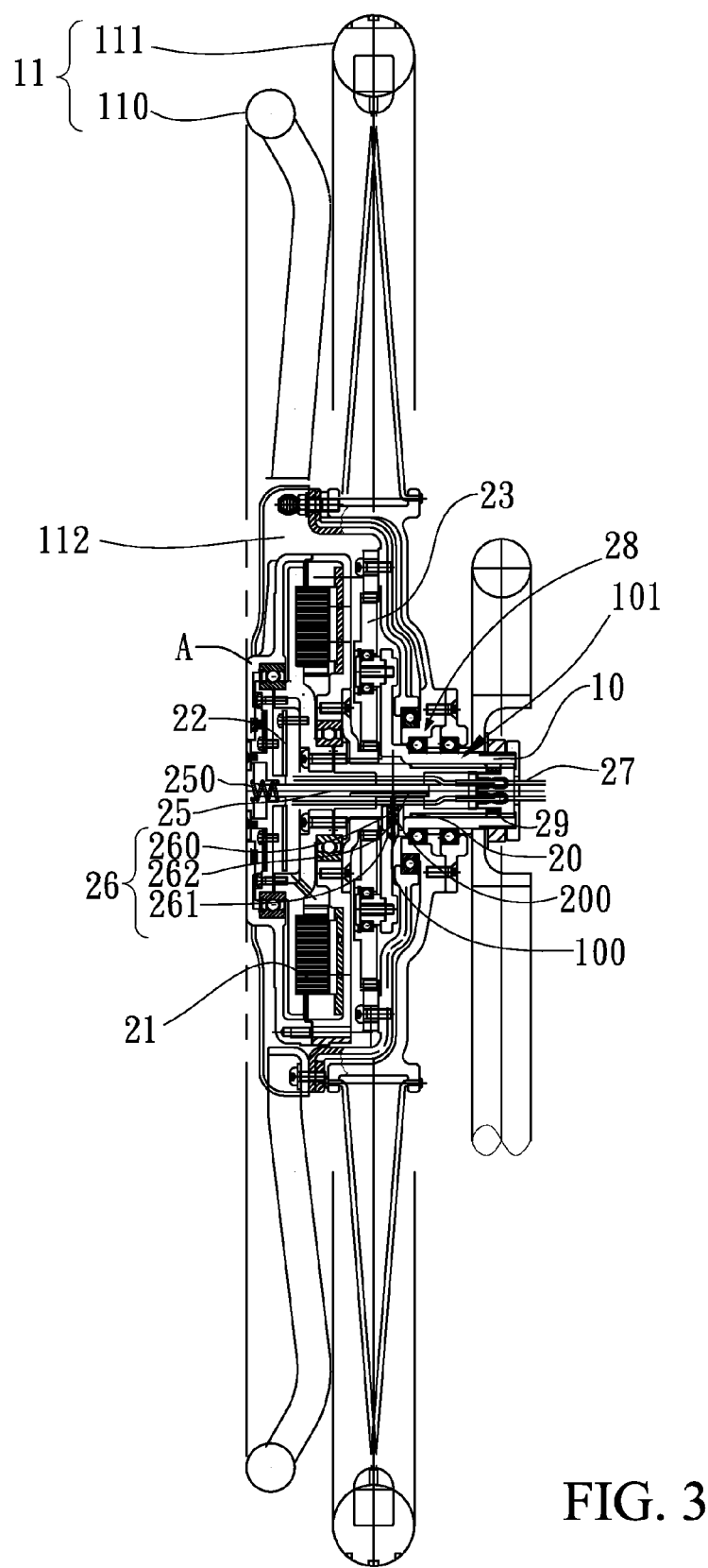
FIG. 3 is a schematic sectional view of a detachable power module according to a first embodiment of the disclosure.

Referring to FIG. 1, FIG. 2, and FIG. 3, a detachable power module according to an embodiment of the disclosure is applied to a wheel chair or a wheel-type vehicle. In the following, a wheel chair is taken as an example for illustration.

A diagram is showing separate rotation unit 11 and power module A in FIG. 1, and a schematic sectional view of the power module A in FIG. 2 are shown in FIG. 3. When the power module A and the rotation unit 11 need to be combined, a central shaft 20 of the power module A is inserted into a wheel shaft 10; three engaging units 26 on the central shaft 20 are respectively snapped into three holes of the wheel shaft 10; and an input gear 23a of a deceleration unit on the central shaft 20 is engaged with a planetary gear of the rotation unit 11. Six embodiments of the combined power module A and rotation unit 11 are described in detail with reference to FIG. 3 to FIG. 8.

The wheel chair has at least one rotation unit 11 and a power supply unit.

Each rotation unit 11 has a hand wheel 110 and a road wheel 111. The hand wheel 110 is arranged at a side of the road wheel 111. A hub receiving space 112 exists between the hand wheel 110 and the road wheel 111.

If the wheel-type vehicle has at least one rotation unit, the rotation unit has the foregoing hub receiving space 112.

The power supply unit may be an energy storage unit, for example, a battery.

The detachable power module has a central shaft 20, a power module A, a pushing unit 25, an engaging unit 26 and at least one central shaft push-out unit 29.

The power module A has a motor unit 21, a control unit 22, a deceleration unit 23, an electrical contact unit 27 and at least one central shaft 20 engaging on the wheel shaft 10.

The wheel shaft 10 is arranged at the rotation unit 11 through a wheel shaft bearing 28; the wheel shaft 10 has at least one fixing hole 100. In this embodiment, the number of the fixing holes 100 is more than one, and the fixing holes 100 are distributed in an equiangular manner.

The wheel shaft 10 is arranged in the rotation unit 11 through the wheel shaft bearing 28; the wheel shaft bearing 28 enables the rotation unit 11 to rotate at a periphery of the wheel shaft 10. A locking interface 101 exists between the wheel shaft 10 and the central shaft 20. The locking interface 101 may be a spline, a quadrate groove or a key groove. The locking interface 101 prevents the central shaft 20 from rotating. The road wheel 111 rotates through a wheel shaft bearing 28. When the road wheel 111 rotates, the wheel shaft 10 maintains a static state. In an example, the wheel shaft 10 is fixed on the wheel chair. If the disclosure is applied to a wheel-type vehicle, the wheel shaft 10 should be arranged at the rotation unit 11 of the wheel-type vehicle through a wheel shaft bearing 28.

The motor unit 21 is arranged in the hub receiving space 112. In an example, the motor unit 21 is an axial flux motor, a radial flux motor or an external rotation motor.

The control unit 22 is arranged in the hub receiving space 112, and is electrically coupled to the motor unit 21.

The deceleration unit 23 is arranged in the hub receiving space 112, and is coupled to the motor unit 21. The deceleration unit 23 is further integrated with the road wheel 111, so as to drive the road wheel 111. In an example, the deceleration unit 23 is a planetary gear set, and the planetary gear is integrated with the rotation unit 11. However, if the deceleration unit 23 is set selectively, the power output of the motor unit 21 is coupled to the rotation unit 11.

The electrical contact unit 27 is arranged in the central shaft 20, and extends towards the wheel chair. The electrical contact unit 27 is electrically coupled to the control unit 22. In an example, the electrical contact unit 27 is a plug or a socket.

The central shaft 20 is arranged in the hub receiving space 112. The central shaft 20 is fixed at a stator set of the motor unit 21 of the power module A, and passes through the wheel shaft 10. The central shaft 20 has at least one receiving hole 200. In an example, the number of the receiving holes 200 is more than one, and the receiving holes 200 are distributed in an equiangular manner.

The pushing unit 25 is arranged in the central shaft 20, and extends towards the wheel shaft 10. A reset piece 250 is arranged on the pushing unit 25. An end of the reset piece 250 pushes against the pushing unit 25, and the pushing unit 25 penetrates through the reset piece 250. Another end of the reset piece 250 pushes against a part of stator sets of motor unit 21. In an example, the pushing unit 25 is a push rod, and the reset piece 250 is a spring.

The engaging unit 26 has at least one reset piece 260, at least one engaging piece 261 and at least one linkage piece 262. The reset piece 260 and the engaging piece 261 are arranged in the receiving hole 200. An end of the reset piece 260 pushes against the engaging piece 261, and another end of the reset piece 261 pushes against the receiving hole 200. The engaging piece 261 passes out of the receiving hole 200, and is selectively engaged at the fixing hole 100. An end of the linkage piece 262 is coupled to the pushing unit 25, and another end of the linkage piece 262 is coupled to the engaging piece 261. In an example, the linkage piece 262 is a steel wire, the engaging piece 261 is a cylinder, and the reset piece 260 is a spring.

The central shaft push-out unit 29 is arranged between the central shaft 20 and the wheel shaft 10, and is located at a side of the central shaft 20. The central shaft push-out unit 29 is an elastic piece. An end of the central shaft push-out unit 29 pushes against the central shaft 20, and another end of the central shaft push-out unit 29 pushes against the wheel shaft 10.

Referring to FIG. 3, the electrical contact unit 27 may be electrically coupled to a power supply unit and a control unit disposed on the wheel chair. In an example, the power supply unit is a battery such a lithium battery, a storage battery, a lead acid battery, a nickel-metal hydride battery, a lithium ion battery, a solar cell or a fuel cell.

The power supply unit supplies power to the control unit 22 and the motor unit 21 through the electrical contact unit 27. The control unit 22 controls the motor unit 21. The power output of the motor unit 21 drives the deceleration unit 23, and the deceleration unit 23 drives the rotation unit 11, so as to drive the wheel chair having the disclosure installed.

The hand wheel 110 is rotated, so as to output a signal to the control unit 22. After receiving the signal, the control unit 22 further controls the power output of the motor unit 21. Alternatively, a rotation actuating unit sends a signal to the control unit 22, so as to further control the output of the motor unit 21.

When the wheel chair needs to be transported to some place and the weight thereof needs to be reduced, the pushing unit 25 is pushed and pressed, and the pushing unit 25 compresses the reset piece 250. The pushing unit 25 pulls the linkage piece 262, so that the engaging piece 261 is no longer engaged at the fixing hole 100. The engaging piece 261 compresses the reset piece 260. An electrical coupling state between the electrical contact unit 27 and the power supply unit is then released, so as to remove the power module A from the hub receiving space 112. The power module A is the foregoing motor unit 21, control unit 22, a part of the deceleration unit 23 and a part of the electrical contact unit 27. After the power module A is removed, the pushing unit 25 is released, so that the reset piece 260 restores the engaging piece 261 to an initial position, and the reset piece 250 restores the pushing unit 25 to an initial position.

When the engaging state is released, the central shaft push-out unit 29 applies a pushing force to the central shaft 20, so as to push a part of the central shaft 20 away from the wheel shaft 10, and to push a part of the power module A out of the hub receiving space 112. Hence, the power module A is easily removed from the hub receiving space 112.

If the power module A needs to be assembled on the hub receiving space 112, the engaging piece 261 needs to be engaged at the fixing hole 100 again, so that the power module A is fixed at the hub receiving space 112.

When the power module A is assembled in the hub receiving space 112 again, the central shaft push-out unit 29 is squeezed by the central shaft 20 and the wheel shaft 10. Therefore, when the engaging state is released again, the squeezed central shaft push-out unit 29 is capable of applying a pushing force to the central shaft 20 again.

Figure 4:
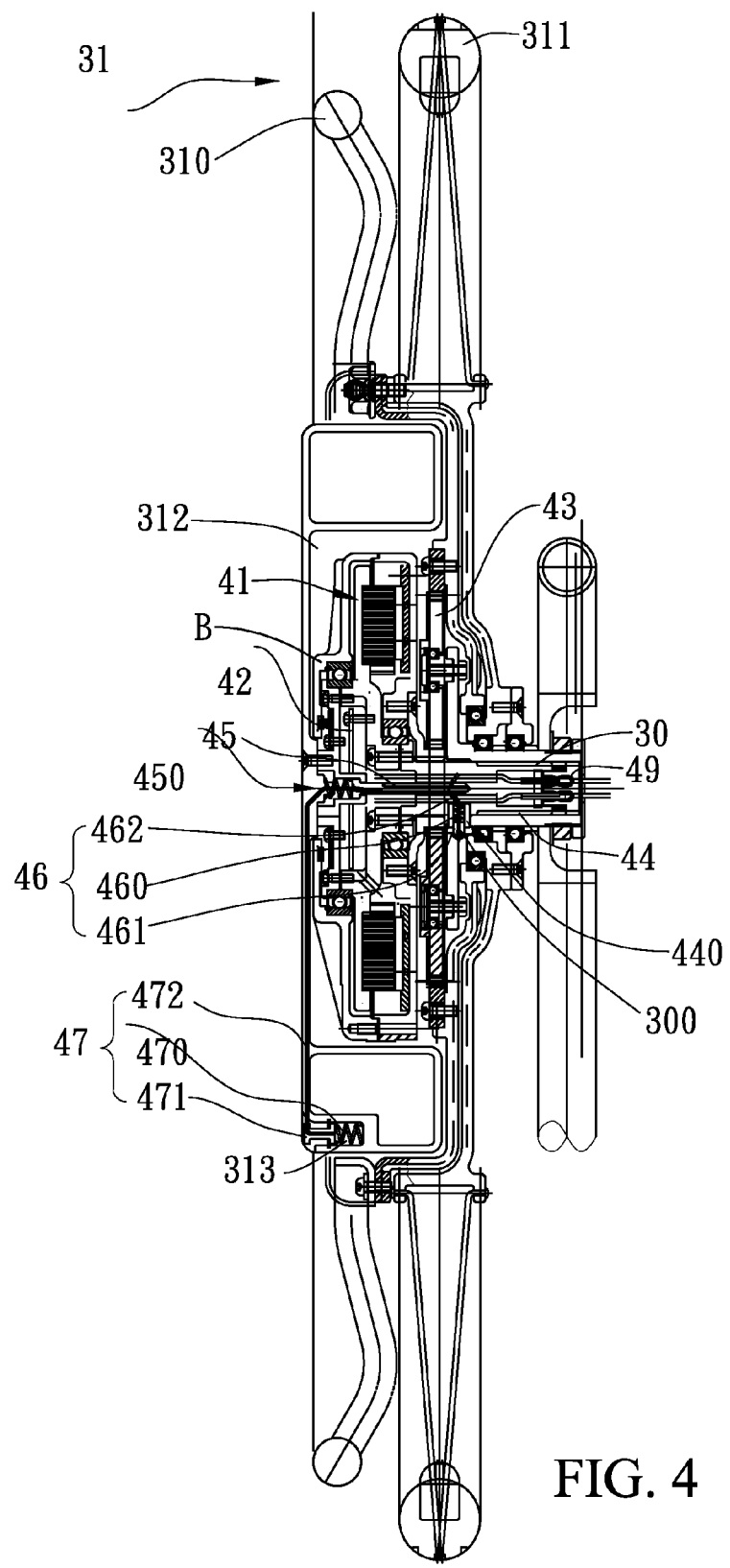
FIG. 4 is a schematic sectional view of a detachable power module according to a second embodiment of the disclosure.

Referring to FIG. 4, a detachable power module according to a second embodiment of the disclosure is applied to a wheel chair. The wheel chair has at least one rotation unit 31. Alternatively, the disclosure is applied to a wheel-type vehicle, the wheel-type vehicle has a frame, and the frame has at least one rotation unit.

Each rotation unit 31 has a hand wheel 310 and a road wheel 311. The hand wheel 310 is arranged at a side of the road wheel 311. A hub receiving space 312 exists between the hand wheel 310 and the road wheel 311. The hub receiving space 312 further has a receiving groove 313.

If the wheel-type vehicle has the rotation unit, the rotation unit has the foregoing hub receiving space 312.

The detachable power module has a central shaft 44, a power module B, a pulling unit 45, an engaging unit 46, a releasing unit 47 and at least a wheel shaft 30.

The wheel shaft 30 is arranged in the rotation unit 31 through a wheel shaft bearing 28, and the wheel shaft 30 is coupled to a wheel chair.

In the case of the wheel-type vehicle, the wheel shaft 30 is arranged at a rotation unit of the wheel-type vehicle.

The power module B has a motor unit 41, a control unit 42, a deceleration unit 43 and an electrical contact unit 49.

The motor unit 41 is arranged in the hub receiving space 312.

The control unit 42 is arranged in the hub receiving space 312, and is electrically coupled to the motor unit 41.

The deceleration unit 43 is arranged in the hub receiving space 312, and is coupled to the power output of the motor unit 41. In an example, the deceleration unit 43 is a planetary gear set, and the planetary gear set is integrated with the rotation unit 41.

The electrical contact unit 49 is arranged in the central shaft 44. The electrical contact unit 49 is electrically coupled to the control unit 42. In an example, the electrical contact unit 49 is a plug or a socket. The electrical contact unit 49 is further electrically coupled to a power supply unit, and the power supply unit is capable of being arranged at a non-rotating part of the wheel chair or the power module B.

The central shaft 44 is arranged in the hub receiving space 312. The central shaft 44 is fixed at a stator set of the motor unit 41 of the power module B, and passes through the wheel shaft 30. The central shaft 44 has a receiving hole 440 at a position corresponding to the fixing hole 300. The number of the receiving holes 440 is three, and the receiving holes 440 are distributed in an equiangular manner.

The pulling unit 45 is arranged in the central shaft 44 and extends towards the wheel shaft 30. The pulling unit 45 has a reset piece 450. An end of the reset piece 450 pushes against the pulling unit 45. The pulling unit 45 passes through the reset piece 450. Another end of the reset piece 450 pushes against the central shaft 44. In an example, the pulling unit 45 is a pulling rod, and the reset piece 450 is a spring.

The engaging unit 46 has at least one reset piece 460, at least one engaging piece 461 and at least one linkage piece 462. The reset piece 460 and the engaging piece 461 are arranged in the receiving hole 440. The engaging piece 461 passes through the reset piece 460, passes out of the receiving hole 440, and is selectively engaged at the fixing hole 300. An end of the linkage piece 462 is coupled to the pulling unit 45, and another end of the linkage piece 462 is coupled to the engaging piece 461. In an example, the linkage piece 462 is a steel wire, the engaging piece 461 is a cylinder, and the reset piece 460 is a spring.

The releasing unit 47 has a reset piece 470, a pushing piece 471 and a connection piece 472. The reset piece 470 and the pushing piece 471 are arranged in the receiving groove 313. An end of the connection piece 472 is coupled to the pushing piece 471, and another end of the connection piece 472 is coupled to the pulling unit 45. In an example, the reset piece 470 is a spring, the pushing piece 471 is a button, and the connection piece 472 is a steel wire.

If the power module B needs to be removed from the hub receiving space 312, the pushing piece 471 is pressed. The pushing piece 471 compresses the reset piece 470. The connection piece 472 is pulled by the pushing piece 471. The connection piece 472 further pulls the pulling unit 45, and the pulling unit 45 compresses the reset piece 450. The pulling unit 45 pulls the linkage piece 462, so that the engaging piece 461 is no longer engaged at the fixing hole 300. The engaging piece 461 compresses the reset piece 460, so that the power module B is free from a fixed state, and the power module B can be removed from the hub receiving space 312.

After the power module B is removed from the rotation unit 31, the pushing piece 471 is no longer pressed. The reset piece 470 restores the pushing piece 471 to an initial position, the reset piece 460 restores the engaging piece 461 to an initial position, and the reset piece 450 restores the pulling unit 45 to an initial position.

If the power module B needs to be assembled on the rotation unit 31 again, as long as the engaging piece 461 is engaged at the fixing hole 300, the power module B is fixed at the rotation unit 31.

Figure 5:
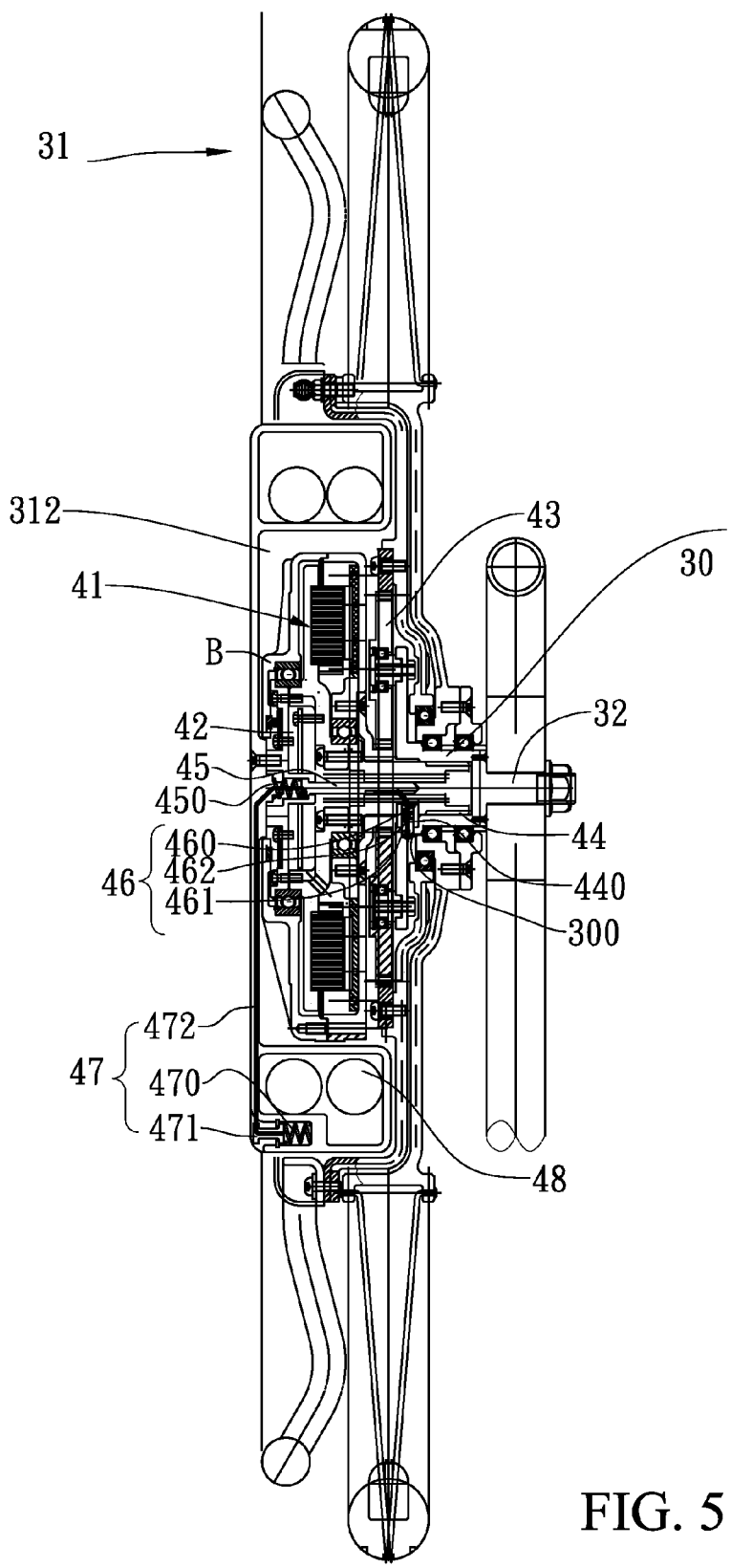
FIG. 5 is a schematic sectional view of a detachable power module according to a third embodiment of the disclosure.

Referring to FIG. 5, FIG. 5 shows a third embodiment of the disclosure. This embodiment is derived from the foregoing second embodiment. Therefore, the actions for assembling and disassembling the power module are the same as those in the second embodiment. Moreover, most components in this embodiment are similar to those in the foregoing embodiment, so in this embodiment, the part being the same as the foregoing embodiment is not described herein again.

The wheel shaft 30, the rotation unit 31, the central shaft 44, the power module B, the pulling unit 45, the engaging unit 46 and the releasing unit 47 are the same as those in the second embodiment.

If the wheel chair is a conventional one without any power system and none of the wheel shafts in the foregoing two embodiments is applicable to the wheel chair, this embodiment further provides a wheel shaft adapter 32. An end of the wheel shaft adapter 32 is coupled to the wheel chair, and another end of the shaft joint 32 is coupled to the wheel shaft 30. The coupling can be implemented by means of a fixing piece.

In addition, if none of the wheel shafts in the foregoing two embodiments is applicable to a frame of a wheel-type vehicle, an end of the wheel shaft adapter 32 is coupled to the frame, and another end of the wheel shaft adapter 32 is coupled to the wheel shaft 30.

This embodiment further comprises a power supply unit 48. The power supply unit 48 is arranged in the hub receiving space 312. The power supply unit 48 is electrically coupled to the control unit 42. In an example, the power supply unit 48 is a battery such as a lithium battery, a storage battery, a lead acid battery, a nickel-metal hydride battery, a lithium ion battery, a solar cell or a fuel cell.

Referring to FIG. 5, the power supply unit 48 supplies power to the control unit 42, so as to drive the motor unit 41, and further drive the deceleration unit 43, thereby driving the rotation unit 31.

Figure 6:
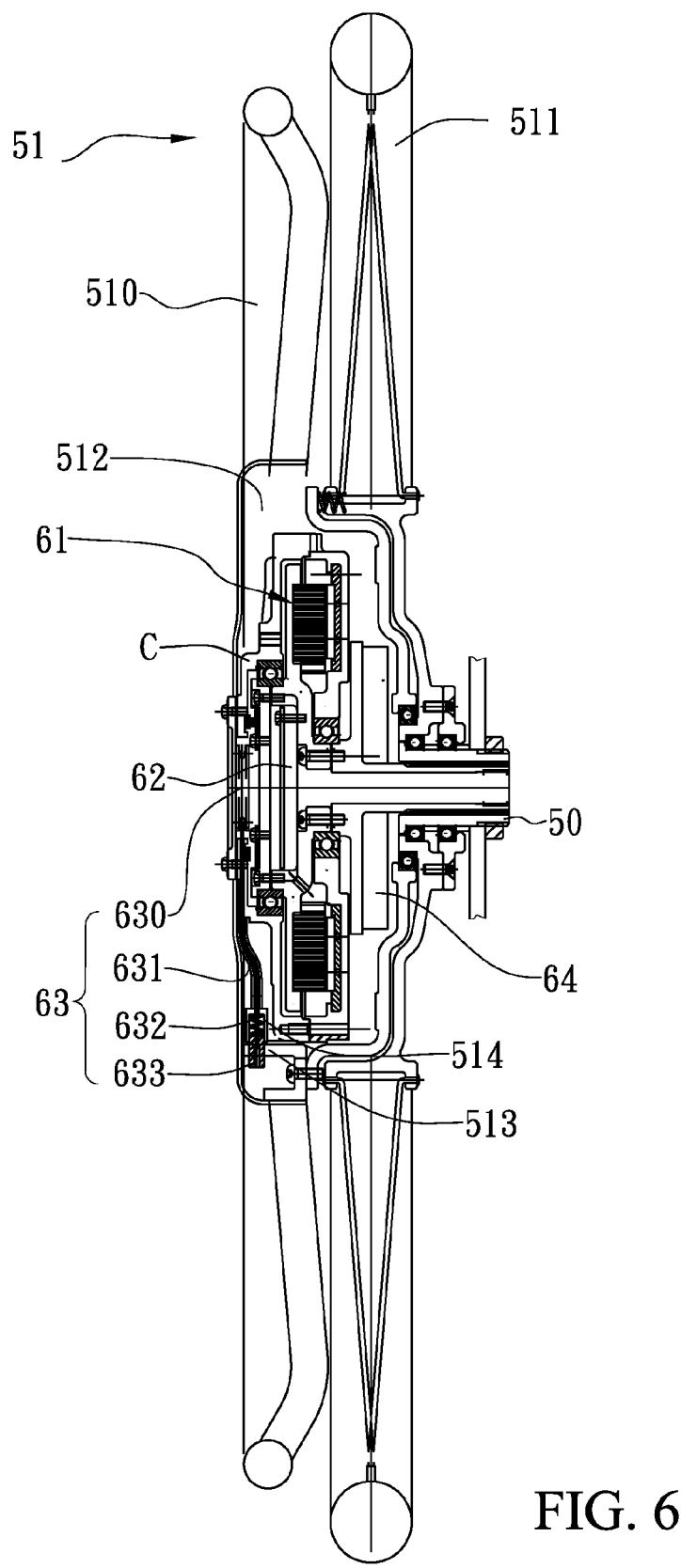
FIG. 6 is a schematic sectional view of a detachable power module according to a fourth embodiment of the disclosure.

Referring to FIG. 6, FIG. 6 shows a fourth embodiment of the disclosure, being applied to a wheel chair. The wheel chair has at least one rotation unit 51. Alternatively, the disclosure is applied to a wheel-type vehicle, the wheel-type vehicle has a frame, and the frame has at least one rotation unit.

Each rotation unit 51 has a hand wheel 510 and a road wheel 511. The hand wheel 510 is arranged at a side of the road wheel 511. The hand wheel 510 has at least one engaging hole 513. In this embodiment, the number of the engaging holes 513 is more than one, and the engaging holes 513 are arranged in an equiangular manner. A hub receiving space 512 exists between the hand wheel 510 and the road wheel 511. The hub receiving space 512 has receiving holes 514 at positions corresponding to the engaging holes 513.

If the rotation unit is arranged at the wheel-type vehicle, the rotation unit has the hub receiving space 512.

The detachable power module has a power module C, a releasing unit 63 and at least one shaft 50.

The power module C has a motor unit 61, a control unit 62 and a power supply unit 64.

The motor unit 61 is arranged in the hub receiving space 512.

The control unit 62 is arranged in the hub receiving space 512, and is electrically coupled to the motor unit 61.

The power supply unit 64 is arranged in the hub receiving space 512, and is electrically coupled to the control unit 62. In an example, the power supply unit 64 is a battery such as a lithium battery, a storage battery, a lead acid battery, a nickel-metal hydride battery, a lithium ion battery, a solar cell or a fuel cell.

If no power supply unit is configured, an electrical contact unit may be arranged at the central shaft as described in the foregoing embodiment. The central shaft passes through the shaft, and the electrical contact unit is electrically coupled to the control unit 62.

The releasing unit 63 has a knob 630, at least one linkage piece 631, at least one reset piece 632 and at least one engaging piece 633. The knob 630 is arranged in the power module C. The reset piece 632 and the engaging piece 633 are arranged in the receiving hole 514. An end of the reset piece 632 pushes against the engaging piece 633, and another end of the reset piece 632 pushes against the receiving hole 514. An end of the engaging piece 633 passes out of the receiving hole 514, and is selectively engaged at the engaging hole 513. An end of the linkage piece 631 is coupled to the knob 630, and another end of the linkage piece 631 is coupled to the engaging piece 633. In an example, the linkage piece 631 is a steel wire, the reset piece 632 is a spring, and the engaging piece 633 is a cylinder.

As shown in FIG. 6, the power supply unit 64 supplies power to the control unit 62. The control unit 62 drives the motor unit 61, and the motor unit 61 drives the rotation unit 51, so as to drive the wheel chair.

When the power module C needs to be removed from the rotation unit 51, the knob 630 is rotated. The knob 630 is linked with the linkage piece 631, and the linkage piece 631 further pulls the engaging piece 633, so that the engaging piece 633 is no longer engaged at the engaging hole 513. The engaging piece 633 compresses the reset piece 632, so that the power module C can be removed from the rotation unit 31. After the power module C is removed, the knob 630 is released, and the reset piece 632 restores the engaging piece 633 to an initial position.

If the power module C needs to be assembled on the rotation unit 51 again, as long as the engaging piece 633 is engaged at the engaging hole 513 again, the detachable power module C of the disclosure can be fixed at the rotation unit 51.

Figure 7:
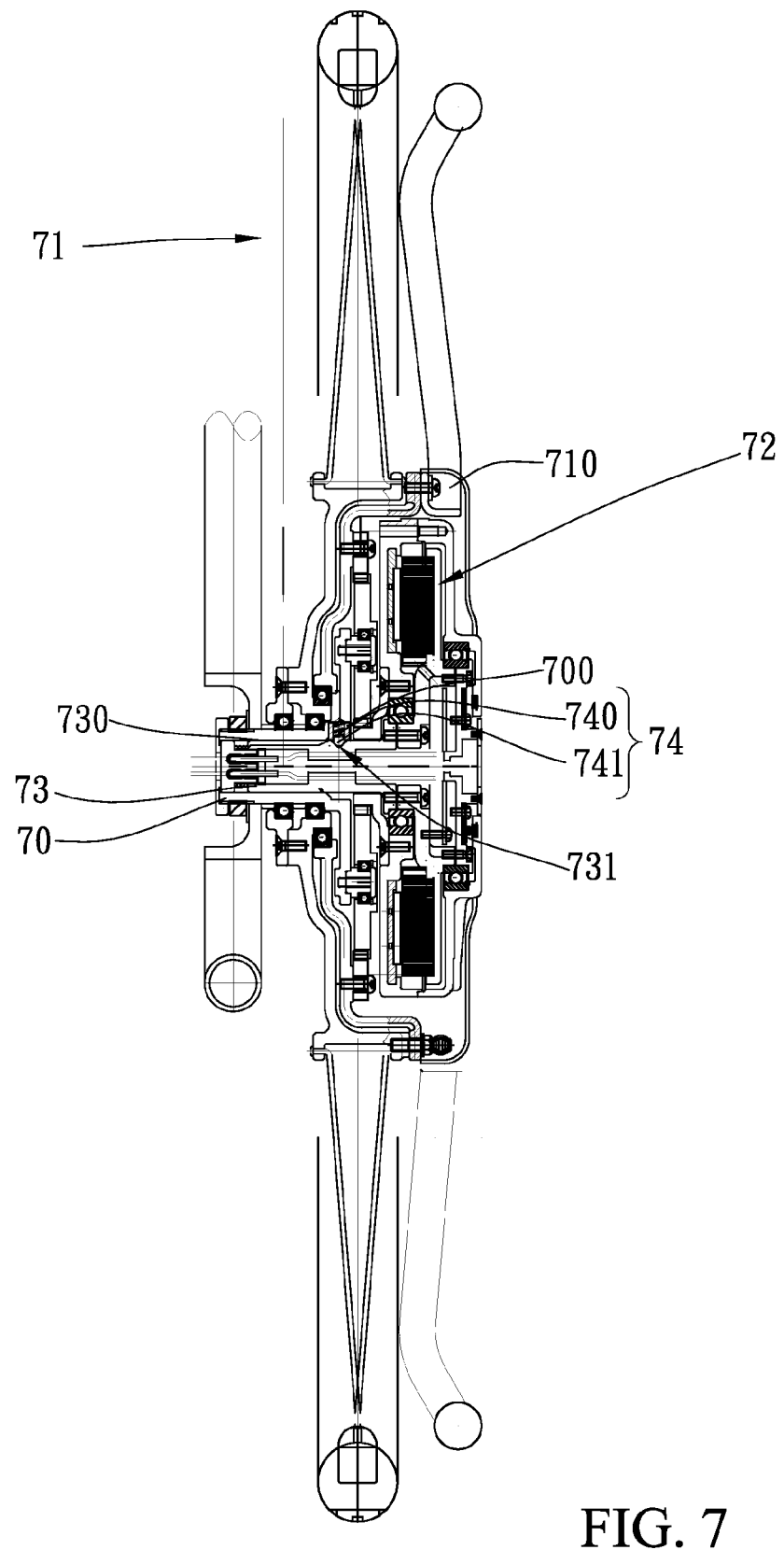
FIG. 7 is a schematic sectional view of a detachable power module according to a fifth embodiment of the disclosure.

Referring to FIG. 7, FIG. 7 shows a fifth embodiment of the disclosure. In this embodiment, the shaft 70, the rotation unit 71, the power module 72 and the central shaft 73 are set in the same manner as the foregoing embodiments.

In this embodiment, the central shaft 73 further has a locking interface 730 and at least one clamping groove 731. The locking interface 730 is, for example, at least a surface, a spline, a quadrate groove or a key groove. The clamping groove 731 is a V-shaped groove.

The at least one receiving groove 700 is arranged at the shaft 70 or in the hub receiving space 710. The receiving groove 700 is located at a position corresponding to the clamping groove 731.

An engaging unit 74 is arranged between the central shaft 73 and the shaft 70. The engaging unit 74 has at least one reset piece 740 and at least one engaging piece 741. The reset piece 740 and the engaging piece 741 are arranged in the receiving groove 700. An end of the reset piece 740 pushes against the receiving groove 700, and another end of the reset piece 740 pushes against the engaging piece 741. The engaging piece 741 is selectively engaged at the clamping groove 731. The reset piece 740 is an elastic component, and the engaging piece 741 is a ball.

Further referring to FIG. 7, if the power module 72 needs to be disassembled from the rotation unit 71, the power module 72 can be extracted directly. When power module 72 is extracted, the engaging piece 741 is under the effect of an external force, rolls along the clamping groove 730, and retracts into the receiving groove 700. The reset piece 740 is compressed, and an engaging state between the engaging piece 741 and the clamping groove 731 is released, so that the power module 72 can be detached from the rotation unit 71.

After the power module 72 is detached from the rotation unit 71, the engaging piece 741 is pushed out of the receiving groove 700 by the reset piece 740.

When the power module 72 needs to be assembled on the rotation unit 71 again, the power module 72 is directly pushed into the rotation unit 71. Being positioned by the locking interface 730, the engaging piece 741 corresponds to the position of the clamping groove 731. When the engaging piece 741 is pushed to the position of the clamping groove 731, the engaging piece 741 rolls along the clamping groove 731. The reset piece 740 pushes the engaging piece 741 into the clamping groove 731, so that the engaging state between the engaging piece 741 and the clamping groove 731 is restored, thereby fixing the power module 72 at the rotation unit 71.

Figure 8:
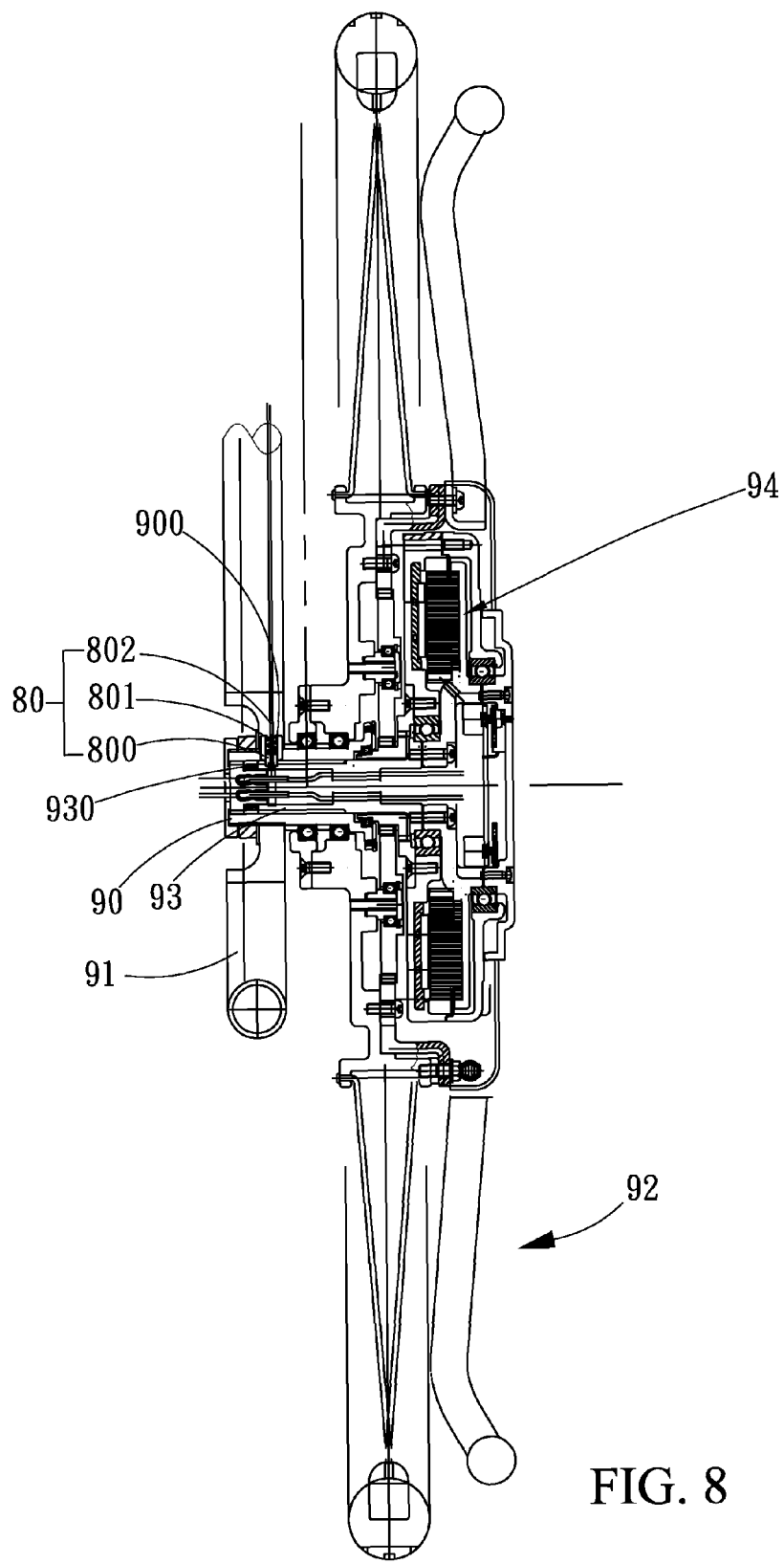
FIG. 8 is a schematic sectional view of a detachable power module according to a sixth embodiment of the disclosure.

Referring to FIG. 8, FIG. 8 shows a sixth embodiment of the disclosure. All components in this embodiment are the same as those in the foregoing embodiments except that the position of the engaging unit is changed. Therefore, the following description is focused on the engaging unit, and other components are not described again.

A shaft 90 is fixed in a frame 91. An engaging unit 80 is located between the shaft 90 and a central shaft 93. The frame 91 is a component of a wheel chair or a component of a wheel-type vehicle.

The central shaft 93 has at least one first receiving space 930. The first receiving space 930 is a slot or a via hole. The number of the first receiving spaces 930 is more than one, and the first receiving spaces 930 are distributed in an equiangular manner. The first receiving space 930 is located at an end of the central shaft 93, that is, the first receiving space 930 is adjacent to the frame 91.

The shaft 90 has at least one second receiving space 900. The second receiving space 900 is a slot or a via hole. If the number of the second receiving spaces 900 is more than one, the second receiving spaces 900 are distributed in an equiangular manner. The second receiving space 900 is opposite the first receiving space 930.

The engaging unit 80 has at least one engaging piece 800, at least one reset piece 801 and at least one optional connection piece 802.

The reset piece 801 is, for example, an elastic component. The reset piece 801 is arranged in the second receiving space 900. An end of the reset piece 801 pushes against the second receiving space 900, and another end of the reset piece 801 pushes against the engaging piece 800, so that the engaging piece 800 is selectively engaged at the first receiving space 930. Based on the above embodiments, the engaging direction in this embodiment is opposite or different from that in the foregoing embodiments.

The connection piece 802 is, for example, a steel wire. An end of the connection piece 802 passes through the reset piece 801, and is coupled to the engaging piece 800. Another end of the connection piece 802 is coupled to a pulling unit that is not shown in the figure. The pulling unit is, for example, a pushing unit, a pulling unit or a releasing unit described in the foregoing embodiments, or a pulling rod having a resilience force. The pulling unit is arranged at the wheel chair or the frame.

As described in the previous embodiment, if no connection piece 802 is set in this embodiment, the first receiving space 930 is a V-shaped slot. When the power module 94 is pulled away from the rotation unit 92, the effect of the external force forces the engaging piece 800 to be released from an engaging state with the first receiving space 930, and the engaging piece 800 compresses the reset piece 801, so that the power module 94 can be detached from the wheel chair or the frame.

If the power module 94 needs to be combined with the wheel chair again, the power module 94 can be pushed into the rotation unit 92 or the frame of the wheel chair, so that the engaging piece 800 is engaged at the first receiving space 930.

If the connection piece 802 is set in this embodiment, when the pulling unit is pulled, the connection piece 802 enables the engaging piece 800 to be released from the engaging state with the first receiving space 930, so that the power module 94 can be detached from the wheel chair or the frame.

Similarly, if the power module 94 needs to be combined with the rotation unit 92 or the frame again, the pulling unit is pulled again, and the power module 94 is pushed into the rotation unit 92 or the frame of the wheel chair. Subsequently, the pulling unit is released, so that the engaging piece 800 is engaged at the first receiving space 930.

To sum up, the embodiments of the disclosure are used for illustrating that the power module can be easily assembled to or disassembled from the rotation unit, thereby reducing the weight of the electric wheel chair or frame, so that the electric wheel chair or frame with the reduced weight can be transported to any place.

Further, if the disclosure is applied to a conventional wheel chair, the disclosure can be combined with the conventional wheel chair through a shaft joint without changing the structure of the original wheel chair.

Based on the above, the shaft joint enables the disclosure to be combined with a frame.

The specific embodiments described above are merely used to illustrate the disclosure exemplarily, and are not intended to limit the application scope of the disclosure. Any equivalent alteration and modification made using the content disclosed herein and without departing from the spirit and technical scope of the disclosure shall fall within the scope of the appended claims.

What is claimed is:

1. A detachable power module, comprising:
a wheel shaft;
a power module;
a central shaft, arranged in the power module and passing through the wheel shaft; and
an engaging unit, capable of fastening the central shaft to the wheel shaft;
wherein the central shaft comprises at least one receiving hole, the engaging unit comprises at least one reset piece, at least one engaging piece and at least one linkage piece, the reset piece and the engaging piece are arranged in the receiving hole, the engaging piece passes out of the receiving hole, and an end of the linkage piece is coupled to the engaging piece; the pushing unit is arranged in the central shaft, the pushing unit is coupled to the engaging unit, the pushing unit comprises a reset piece, an end of the reset piece pushes against the pushing unit, and another end of the reset piece pushes against the central shaft.

2. The detachable power module according to claim 1, wherein the power module comprises a motor unit and a control unit, and the motor unit is electrically coupled to the control unit; a deceleration unit, and the deceleration unit is coupled to the motor unit; and an electrical contact unit, the electrical contact unit is arranged on the central shaft, and the electrical contact unit is electrically coupled to the control unit.

3. The detachable power module according to claim 1, wherein the reset piece is an elastic component, the pushing unit is a push rod; the number of the receiving holes is more than one, the linkage piece is a steel wire, and the engaging piece is a cylinder.

4. The detachable power module according to claim 3, wherein the detachable power module is applied to a wheel chair, the wheel chair comprises at least one rotation unit, each rotation unit comprises a hand wheel and a road wheel, the hand wheel is arranged at a side of the road wheel, a hub receiving space exists between the hand wheel and the road wheel, the power module and the central shaft are arranged in the hub receiving space, the shaft is arranged at the road wheel, a locking interface exists between the shaft and the central shaft, and the engaging unit is selectively engaged with the wheel shaft, the shaft comprises at least one fixing hole, and the engaging piece is selectively engaged at the fixing hole; or the detachable power module is applied to a wheel chair, the wheel chair comprises at least one rotation unit, each rotation unit comprises a hand wheel and a road wheel, the hand wheel is arranged at a side of the road wheel, a huh receiving space exists between the hand wheel and the road wheel, the power module and the central shaft are arranged in the hub receiving space, the wheel shaft is arranged at the road wheel, a locking interface exists between the wheel shaft and the central shaft, the engaging unit is selectively engaged with the central shaft; alternatively, the detachable power module is applied to a wheel-type vehicle, the wheel-type vehicle comprises at least one rotation unit, the rotation unit comprises a hub receiving space, the wheel shaft is arranged at the rotation unit, a locking interface exists between the shaft and the central shaft, and the engaging unit is selectively engaged with the central shaft, an end of the central shaft at least comprises a central shaft push-out unit.

5. A detachable power module, comprising:
a wheel shaft:
a power module;
a central shaft, arranged in the power module and passing through the wheel shaft; and
an engaging unit, capable of fastening the central shaft to the wheel shaft;
wherein the central shaft comprises at least one clamping groove, at least one receiving groove is selectively arranged at the shaft or in a hub receiving space of a rotation unit of a wheel-type vehicle, the engaging unit comprise at least one reset piece and at least one engaging piece, the reset piece and the engaging piece are arranged in the receiving groove, an end of the reset piece pushes against the receiving groove, another end of the reset piece pushes against the engaging piece, and the engaging piece is selectively engaged at the clamping groove; the reset piece is an elastic component, the engaging piece is a ball, the locking interface is at least a surface, a spline, a quadrate groove or a key groove, and the clamping groove is a V-shaped groove.

6. A detachable power module, comprising:
a wheel shaft;
a power module;
a central shaft, arranged in the power module and passing through the wheel shaft; and
an engaging unit, capable of fastening the central shaft to the wheel shaft;
wherein the central shaft comprises at least one first receiving space; the wheel shaft comprises at least one second receiving space; the engaging unit is arranged in the second receiving space, and is selectively engaged with the first receiving space; the detachable power module is applied to a frame, and the frame is a wheel chair or a wheel-type vehicle; the engaging unit comprises at least one engaging piece and at least one reset piece, the reset piece is arranged in the second receiving space, an end of the reset piece pushes against the second receiving space, another end of the reset piece pushes against the engaging piece, and the engaging piece is selectively engaged the first receiving space; the engaging unit further comprises at least one connection piece, and the connection piece is coupled to the engaging piece.

7. The detachable power module according to claim 6, wherein the engaging unit is located at an end of the central shaft, and the end is adjacent to the frame.

8. A detachable power module, comprising:
a wheel shaft;
a power module;
a central shaft, arranged in the power module and passing through the wheel shaft;
an engaging unit, capable of fastening the central shaft to the wheel shaft; and
a releasing unit, arranged at the power module, the releasing unit being coupled to the engaging unit;
wherein the central shaft comprises at least one receiving hole, the engaging unit comprises at least one reset piece, at least one engaging piece and a linkage piece, the reset piece and the engaging piece are arranged in the receiving hole, the engaging piece passes out of the receiving hole, and an end of the linkage piece is coupled to the engaging piece; the detachable power module according, further comprises a pulling unit arranged at the central shaft, two ends of the pulling unit are respectively coupled to the engaging unit and the releasing unit, the pulling unit comprises a reset piece, an end of the reset piece pushing against the puling unit, and another end of the reset piece pushing against the central shaft.

9. The detachable power module according to claim 8, wherein the power module comprises a motor unit and a control unit, and the motor unit is electrically coupled to the control unit; a deceleration unit, and the deceleration unit is coupled to the motor unit; and an electrical contact unit, the electrical contact unit is arranged at the central shaft, and the electrical contact unit is electrically coupled to the control unit.

10. The detachable power module according to claim 8, wherein the reset piece is an elastic component, the pulling unit is a pulling rod; the number of the receiving holes is more than one; the linkage piece is a steel wire, and the engaging piece is a cylinder 11. The detachable power module according to claim 8, wherein the detachable power module is applied to a wheel chair, the wheel chair comprises at least one rotation unit, each rotation unit comprises a hand wheel and a road wheel, the hand wheel is arranged at a side of the road wheel, a hub receiving space exists between the hand wheel and the road wheel, the power module aid the central shaft are arranged in the hub receiving space, the wheel shaft is arranged at the road wheel, a locking interface exists between the wheel shaft and the central shaft, and the engaging unit is selectively engaged with the wheel shaft; alternatively, the detachable power module is applied to a wheel-type vehicle, the wheel-type vehicle comprises at least one rotation unit, each rotation unit comprises a hub receiving space, the power module and the central shaft are arranged in the hub receiving space, the wheel shaft is arranged at the rotation unit, a locking interface exists between the wheel shaft and the central shaft, and the engaging unit is selectively engaged with the wheel shaft; the hub receiving space comprises a receiving groove; the releasing unit comprises a reset piece, a pushing piece and a connection piece, the reset piece and the pushing piece are arranged in the receiving groove, an end of the connection piece is coupled to the pushing piece, and another end of the connection piece is coupled to the pulling unit.

12. A removable power module, comprising:
a wheel shaft;
a power module;
a central shaft, arranged in the power module and passing through the wheel shaft;
an engaging unit, capable of fastening the central shaft to the wheel shaft;
a releasing unit, arranged at the power module, the releasing unit being coupled to the engaging unit; and
a wheel shaft adapter, coupled to the wheel shaft;
wherein the central shaft comprises at least one receiving hole, the engaging unit comprises at least one reset piece, at least one engaging piece and a linkage piece, the reset piece and the engaging piece are arranged in the receiving hole, the engaging piece passes out of the receiving hole, and an end of the linkage piece is coupled to the engaging piece; the detachable power module further comprises a pulling unit arranged in the central shaft, two ends of the pulling unit respectively coupled to the engaging unit and the releasing unit, the pulling unit comprising a reset piece, an end of the reset piece pushing against the pushing unit, and another end of the reset piece pushing against the central shaft.

13. The detachable power module according to claim 12, wherein the power module comprises a motor unit and a control unit, and the motor unit is electrically coupled to the control unit; a deceleration unit, and the deceleration unit is coupled to the motor unit; and a power supply unit, and the power supply unit is electrically coupled to the control unit.

14. The detachable power module according to claim 13, wherein the power supply unit is a lithium battery, a storage battery, a lead acid battery, a nickel-metal hydride battery, a lithium ion battery, a solar cell or a fuel cell.

15. The detachable power module according to claim 12, wherein the reset piece is an elastic component, the pulling unit is a pulling rod; the number of the receiving holes is more than one, the receiving holes are distributed in an equiangular manner; the linkage piece is a steel wire, and the engaging piece is a cylinder.

16. The detachable power module according to claim 12, wherein the detachable power module is applied to a wheel chair, the wheel chair comprises at least one rotation unit, each rotation unit comprises a hand wheel and a road wheel, the hand wheel is arranged at a side of the road wheel, a hub receiving space exists between the hand wheel and the road wheel, the power module and the central shaft are arranged in the hub receiving space, the wheel shaft is arranged at the road wheel, a locking interface exists between the wheel shaft and the central shaft, and the engaging unit is selectively engaged with the wheel shaft; alternatively, the detachable power module is applied to a wheel-type vehicle, the wheel-type vehicle comprises at least one rotation unit, each rotation unit comprises a hub receiving space, the power module and the central shaft are arranged in the hub receiving space, the wheel shaft is arranged at the rotation unit, a locking interface exists between the wheel shaft and the central shaft, and the engaging unit is selectively engaged with the wheel shaft; the hub receiving space comprises a receiving groove; the releasing unit comprises a reset piece, a pushing piece and a connection piece, the reset piece and the pushing piece are arranged in the receiving groove, an end of the connection piece is coupled to the pushing piece, and another end of the connection piece is coupled to the pulling unit.

17. A detachable power module, comprising:
a power module; and
a releasing unit, arranged at the power module;
wherein the detachable power module is applied to a wheel chair, the wheel chair comprises at least one rotation unit, each rotation unit has a hand wheel and a road wheel, the hand wheel is arranged at a side of the road wheel, a hub receiving space exists between the hand wheel and the road wheel, and the power module is arranged in the hub receiving space: alternatively, the removable power module is applied to a wheel-type vehicle, the wheel-type vehicle comprises at least one rotation unit, each rotation unit comprises a hub receiving space, and the power module is arranged in the hub receiving space; and the hub receiving space comprises at least one receiving hole; the releasing unit comprises a knob, at least one linkage piece, at least one reset piece and at least one engaging piece, the knob is arranged in the hub receiving space, the reset piece and the engaging piece are arranged in the receiving hole, an end of the reset piece pushes against the engaging piece, another end of the reset piece pushes against the receiving hole, an end of the engaging piece passes out of the receiving hole, an end of the linkage piece is coupled to the knob, and another end of the linkage piece is coupled to the engaging piece.

18. The detachable power module according to claim 17, wherein the power module comprises a motor unit and a control unit, and the motor unit is electrically coupled to the control unit; a power supply unit, and the power supply unit is electrically coupled to the control unit; at least one shaft, and the shaft is coupled to the central shaft; the power module further comprises an electrical contact unit, and the electrical contact unit is coupled to the control unit; and a deceleration unit, and the deceleration unit is coupled to the motor unit.

19. The detachable power module according to claim 18, wherein the motor unit is an axial flux motor, a radial flux motor or an external rotation motor.

20. The detachable power module according to claim 17, wherein the number of the receiving holes is more than one, and the receiving holes are distributed in an equiangular manner; the linkage piece is a steel wire, the reset piece is a spring, and the engaging piece is a cylinder.

* * * * *